United States Patent Office 2,908,162
Patented Oct. 13, 1959

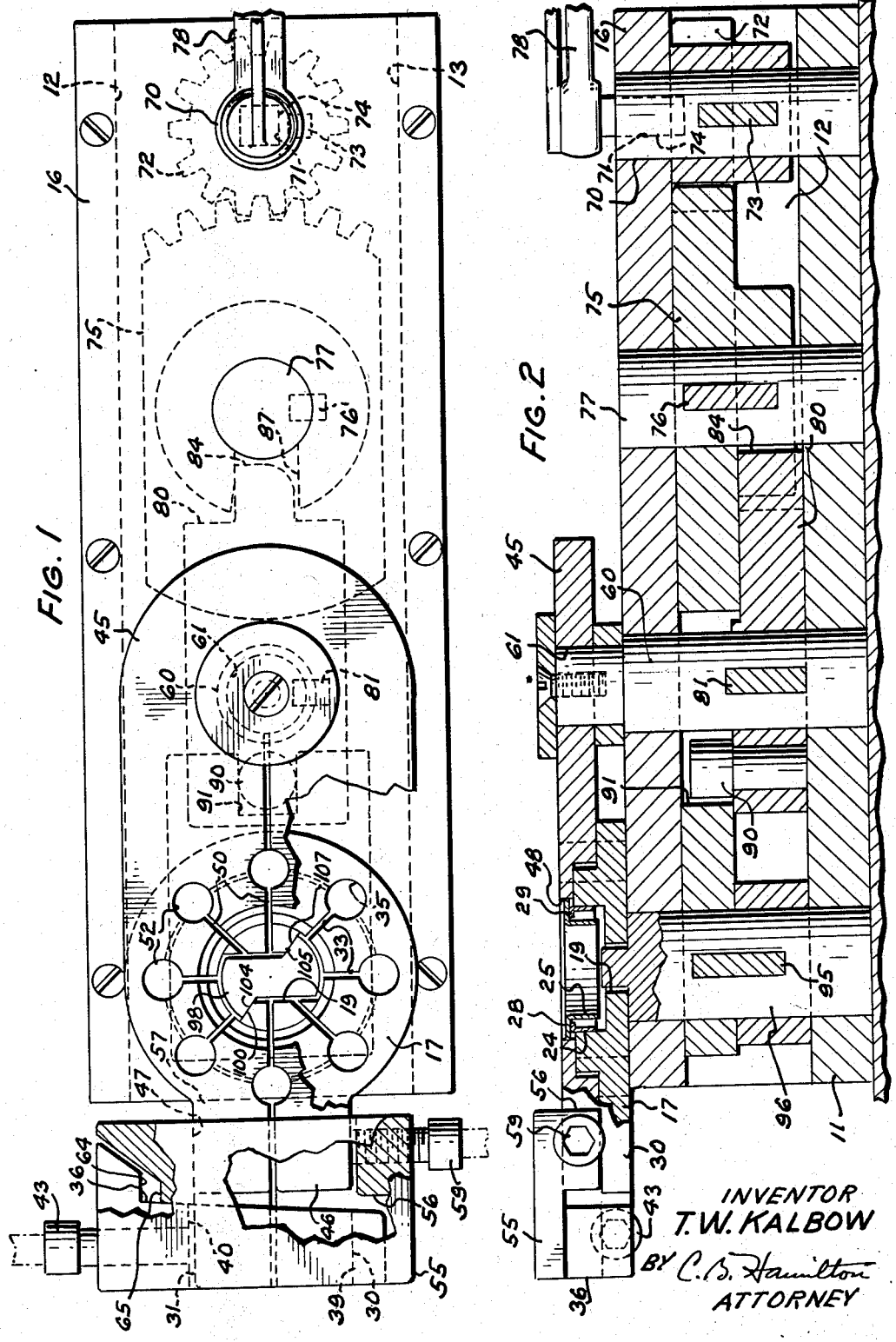

2,908,162

WELD TESTING FIXTURE

Theodore W. Kalbow, Chicago, Ill., assignor to Western Electric Company, Incorporated, New York, N.Y., a corporation of New York Application December 31, 1956, Serial No. 631,631

7 Claims. (Cl. 73—99)

This invention relates to weld testing devices and more particularly to devices for testing spot welds of two concentric elements of a telephone receiver component.

In testing the mechanical strength of welds it has been a prior practice to hold one of a pair of members welded together and apply a force of shearing magnitude to the other, attempting at the same time to measure that force. Inasmuch as the force may be applied unevenly, or difficulty may be encountered in measuring the force applied to break the weld, this method has not always been satisfactory. With this fact in mind, one of the objects of this invention is to provide a weld testing device wherein a small, easily measured force is multiplied by a torque transmitting train of members and applied to move a clamp holding one of a pair of elements which are welded together relative to a second clamp holding the other welded element.

Another object of this invention is to provide a device for testing welds between two concentric elements.

A still further object of this invention is to provide a weld testing device having a fixed clamp for holding an inside element of two concentric elements welded together, and a movable clamp for holding an outside element, together with force multiplication means for moving the second clamp relative to the first to sever the welded joint.

One embodiment of the invention for testing welds may include a fixed clamp for holding the inside element of two concentric elements which are welded together and a movable clamp for holding the outside element. Torque, applied with a conventional torque wrench, is transmitted through a train of members to the movable clamp for rotating the outside element relative to the inside element to break the weld therebetween. The amount of force required to break the weld can be computed by applying the mechanical advantage gained by the train of members to a reading taken directly from the torque wrench.

Other objects and advantages of the invention will become apparent by reference to the following detailed description and the accompanying drawing illustrating a preferred embodiment of the invention, in which:

Fig. 1 is a plan view of the device showing the configurations of the clamps and the members in the torque transmitting train comprising an embodiment of the present invention, and Fig. 2 is a vertical sectional view taken on line 2—2 of Fig. 1 showing the cross-sectional configuration of the two elements which are welded together and the components of the weld testing device.

Referring now in detail to the drawing, a base 11 is shown supporting a pair of spaced vertical side walls 12 and 13 upon which is secured a horizontal plate 16. A bifurcated, movable clamp 17 rests on the plate 16 and is provided with a central aperture 19 having a counterbored portion for receiving a tubular outer element 24 of a telephone receiver component which is made up of an inner tubular element 25 that is concentric with the outer tubular element 24. The inner element 25 is provided with a flange 28 that extends radially outward from one end of the element 25 and which has an outside diameter greater than the diameter of the outer element 24. The outer element 24 is provided with a flange 29 which extends radially inward from one end of the element 24 and is spot welded at several points to the flange 28 of the element 25. It is these welded joints that the present invention is designed to test. The clamp 17 is also provided with portions 30 and 31 and a plurality of slots 33 (Fig. 1) extending radially from the central aperture 19 and terminating in holes 35 in the clamp 17 to render it flexible enough that the walls of the counterbored portion of the aperture 19 will grip and hold the outer element 24 when the portions 30 and 31 are forced together.

A bar 36 positioned on the portions 30 and 31 is provided with projections 39 and 40 which depend therefrom on opposite sides of the portions 30 and 31. A set screw 43 threaded through the projection 40 and engaging the portion 31 is provided for forcing the portions 30 and 31 together to cause the clamp 17 to grip and hold the outer element 24.

A bifurcated, fixed clamp 45 rests on the movable clamp 17 and is provided with portions 46 and 47 and an opening 48 concentric with the counterbored portion of the aperture 19 in the clamp 17, the walls of the aperture 48 engaging the flange 28 of the inner element 25. A plurality of slots 50 extend radially outward from the opening 48 and terminate in holes 52 to render the clamp 45 flexible enough that the walls of the opening 48 grip and hold the flange 28 of the element 25 when the portions 46 and 47 are forced together. A plate 55 extending across the portions 46 and 47 is provided with projections 56 and 57 which depend therefrom on opposite sides of the portions 46 and 47 of the clamp 45. A set screw 59 threaded through the depending projection 56 and engaging the portion 46 is provided for forcing the portions 46 and 47 together to cause the clamp 45 to grip and hold the flange 28 of the element 25. A first shaft 60 rotatably mounted in the base 11 and the plate 16 extends through a hole 61 in the clamp 45 to prevent movement thereof. Relative rotative movement between the clamps 17 and 45 is limited by stop surfaces 64 and 65 (Fig. 1) on the depending projections 40 and 57, respectively, the stop 64 engaging the stop 65 when the clamp 17 is rotated counterclockwise (Fig. 1) slightly.

A second shaft 70 having a socket 71 for receiving a bit 74 of a torque wrench 78 of a well-known type is rotatably mounted in the base 11 and the plate 16. A gear 72 secured to the second shaft 70 by a key 73 meshes with a toothed member 75 secured by a key 76 to a third shaft 77, which is rotatably mounted on the base 11 and the plate 16. A first plate 80, secured by a key 81 to the first shaft 60, is provided with a projection 84 which is positioned in a recess 87 (Fig. 1) formed in the untoothed sectional member 75 whereby rotation of the member 75 causes the first plate 80 and the first shaft 60 to rotate. A pin 90 secured to the first plate 80 is positioned in a slot 91 in a second plate secured by a key 95 to a fourth shaft 96 which is rotatably mounted in the base 11 and the plate 16. The fourth shaft 96 is provided with a lug 98 which extends upward into the aperture 19 in the movable clamp 17 to transmit torque from the train of gears and plates to the movable clamp 17. Bearing surfaces 100 and 107 on the lug 98 engage bearing surfaces 104 and 105, respectively, on the clamp 17 to transmit torque from the fourth shaft 96 to the clamp 17 without causing it to loosen its grip on the outer element 24.

In operation of the device to test the strength of the spot welds holding the outer and inner elements 24 and 25 together, the elements are positioned in the device with the outer element 24 engaging the walls of the counterbored portion of the aperture 19 and with the flange 28 of the inner element 25 engaging the wall of the opening 48 in the fixed clamp 45. The set screw 43 is tightened to cause the clamp 17 to grip and hold the outer element 24, and the set screw 59 is tightened to cause the fixed clamp 45 to grip and hold the flange 28 on the inner element 25.

The bit 74 of the torque wrench 78 of a well-known type is inserted into the socket 71 of the second shaft 70 and manually rotated clockwise (Fig. 1) until the spot welds between the inner and outer elements 24 and 25 break, the amount of torque applied to the second shaft 70 being read directly from the torque wrench. The clamp 17 is then free to move until the stop surface 64 engages the stop surface 65. The actual amount of torque applied to the outer element 24 to break the spot welds can be computed by determining the mechanical advantage gained by use of the train of gears and plates and applying it to the value read from the torque wrench.

The separated elements 24 and 25 are then removed from the device and another component is inserted therein and tested as described above.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A weld testing device, comprising a base, a fixed clamp mounted on the base and having a counterbored opening for receiving and holding a flange of one of a plurality of articles welded together, a movable clamp mounted on the base and having a cylindrical counterbored section extending into the counterbore in the fixed clamp for receiving and holding another of said plurality of articles, means for transmitting torque to said movable clamp to break the weld between the articles, and means mounted on the clamps for limiting relative movement therebetween.

2. A device for testing welds, comprising a base, a fixed flexible clamp mounted on the base and having a counterbored opening for receiving one of a pair of articles welded together, means for flexing said fixed clamp to grip and hold said one article positioned in the opening, a flexible clamp movably mounted on the base and having an apertured cylindrical portion extending into the counterbore in the fixed clamp for receiving the other of said pair of articles, means for flexing said movable clamp to grip and hold said other article positioned in said apertured portion, and means on the base for actuating the movable clamp to break a weld between said one article and said other article.

3. A device for testing welds, comprising base, a fixed flexible clamp mounted on the base and having an opening for receiving one of a plurality of articles which are welded together, means on the fixed clamp for flexing said clamp to grip and hold the article positioned in the opening, a flexible clamp movably mounted on the base and having an aperture with a counterbored portion for receiving another of said plurality of articles, said aperture having a pair of surfaces in a plane diametrical to the counterbored portion, means on the movable clamp for flexing said movable clamp to grip and hold the article positioned in the aperture, and a plurality of members movably mounted on the base and connected in a train to the movable clamp for transmitting torque thereto to break a weld between said one article, the last member in said train having a pair of surfaces for engaging the surfaces in said aperture in the movable clamp for transmitting torque thereto without distorting said clamp and said another article.

4. A device for testing welds, comprising a base, a flexible fixed clamp mounted on the base and having an opening for receiving and clamping a circular flange of one of a pair of articles which are welded together, means on the fixed clamp for flexing said clamp to grip and hold said one article, a flexible clamp movably mounted on the base in engagement with the fixed clamp and having an upper surface for engaging and supporting the circular flange until the fixed clamp is flexed and also having an aperture intersecting said upper surface for receiving a cylindrical portion of the other article of said pair of articles, means mounted on the movable clamp for flexing said clamp to grip and hold said cylindrical portion of the other article, means on both said flexing means for limiting movement of the movable clamp relative to the fixed clamp, a shaft rotatably mounted on the base and connected to the movable clamp, a plurality of other shafts rotatably mounted on the base, and a plurality of members secured to said shaft and other shafts and interconnected with each other to form a torque transmitting train.

5. A weld testing device, comprising a base, a fixed clamp mounted on the base and having an opening for receiving one of a plurality of articles which are welded together and also having a slot intersecting said opening for rendering the clamp flexible to grip and hold said one article positioned in said opening, a first element mounted on the fixed clamp for applying a force thereto to close the slot therein whereby the article in said opening is gripped and held, a clamp movably mounted on the base and having an aperture with a counterbored portion for receiving another of said plurality of articles and also having a slot intersecting the aperture to render the clamp flexible to grip and hold said another article positioned in said counterbored portion, said aperture having a pair of surfaces in a plane extending diametrically across said counterbored portion, a second element mounted on the movable clamp for applying a force thereto to close the slot therein whereby said another article in the aperture is gripped and held, a shaft mounted on the base and extending into the aperture in the movable clamp, said shaft having thereon a pair of surfaces for engaging the surfaces in the aperture in the movable clamp to transmit force thereto without distorting said movable clamp and a plurality of members movably mounted on the base and interconnected with each other for transmitting force through the shaft to the movable clamp to break a weld between said one article and said another article, said first element having portions thereon engageable by portions of said second element for limiting relative movement between the clamps when the weld breaks.

6. A weld testing device, comprising a base, a fixed clamp mounted on the base and having a cylindrical recess for receiving and holding one of a plurality of articles welded together, a movable clamp mounted on the base having an aperture with a cylindrically counterbored portion for receiving and holding another of said plurality of articles, said aperture having a pair of surfaces in a plane extending diametrically across said counterbored portion, a first shaft rotatably mounted on the base and engaging the fixed clamp to prevent movement thereof, a second shaft mounted on the base, a gear secured to the second shaft, a third shaft mounted on the base, a toothed member secured to the third shaft and meshed with the gear on the second shaft, said toothed member having a recess therein, a first plate secured to the first shaft and having a projection positioned in the recess in the toothed member whereby rotation of the toothed member rotates the plate and the first shaft, a fourth shaft mounted on the base to extend into the aperture in the movable clamp and having a pair of surfaces in a plane diametrical thereto for engaging the surfaces in the aperture in the movable clamp to transmit force thereto without distorting said movable clamp, a second plate secured to the fourth shaft and having a slot therein, a pin secured to the first plate and extending into the slot in the second plate whereby the fourth shaft is rotated a limited amount when the first shaft is rotated a limited amount, and means for applying a force to the second shaft whereby torque is transmitted through the interconnected gear, toothed member, first and second plates and the shafts to rotate said another article to break a weld between it and said one article.

7. A device for testing welds, comprising a base, a clamp movably mounted on the base and having an aperture for receiving a first of a pair of articles welded together, said clamp also having a first slot extending from the aperture to one edge of the clamp and a plurality of slots extending radially from said aperture to render the clamp flexible, a fixed clamp resting on the movable clamp and having an opening for receiving the second of said pair of articles, said fixed clamp also having a slot intersecting the opening and a plurality of slots extending radially from said opening to render the fixed clamp flexible, a first element mounted on the fixed clamp for applying a force thereto to grip said second article in the opening in the fixed clamp, a second element mounted on the movable clamp for flexing said movable clamp to grip said second article in the aperture in said movable clamp, said first element being engageable by the second element for limiting relative movement between the clamps, a first shaft rotatably mounted on the base and engaging the fixed clamp to prevent movement thereof, a second shaft mounted on the base, a gear secured to the second shaft, a third shaft mounted on the base, a toothed member secured to the third shaft and meshed with the gear on the second shaft, said toothed member having a recess therein, a first plate secured to the first shaft and having a projection positioned in the recess in the toothed member whereby limited rotation of the toothed member rotates the plate and the first shaft slightly, a fourth shaft mounted on the base and connected to the movable clamp, a second plate secured to the fourth shaft and having a slot therein, a pin secured to the first plate and extending into the slot in the second plate whereby the fourth shaft is rotated a limited amount when the first shaft is rotated a limited amount, and means for applying a force to the second shaft whereby torque is transmitted through the interconnected gear, toothed member, first and second plates and the shafts to rotate said first article relative to the first to break a weld between said articles.

References Cited in the file of this patent

UNITED STATES PATENTS

| | | |
|---|---|---|
| 1,907,461 | Sunde | May 9, 1933 |
| 2,122,760 | Scott et al. | July 5, 1938 |
| 2,152,541 | Galpin | Mar. 28, 1939 |
| 2,279,698 | Weckerly | Apr. 14, 1942 |
| 2,558,005 | Sciaky | June 26, 1951 |
| 2,799,162 | Carlson | July 16, 1957 |